United States Patent Office 3,585,677
Patented June 22, 1971

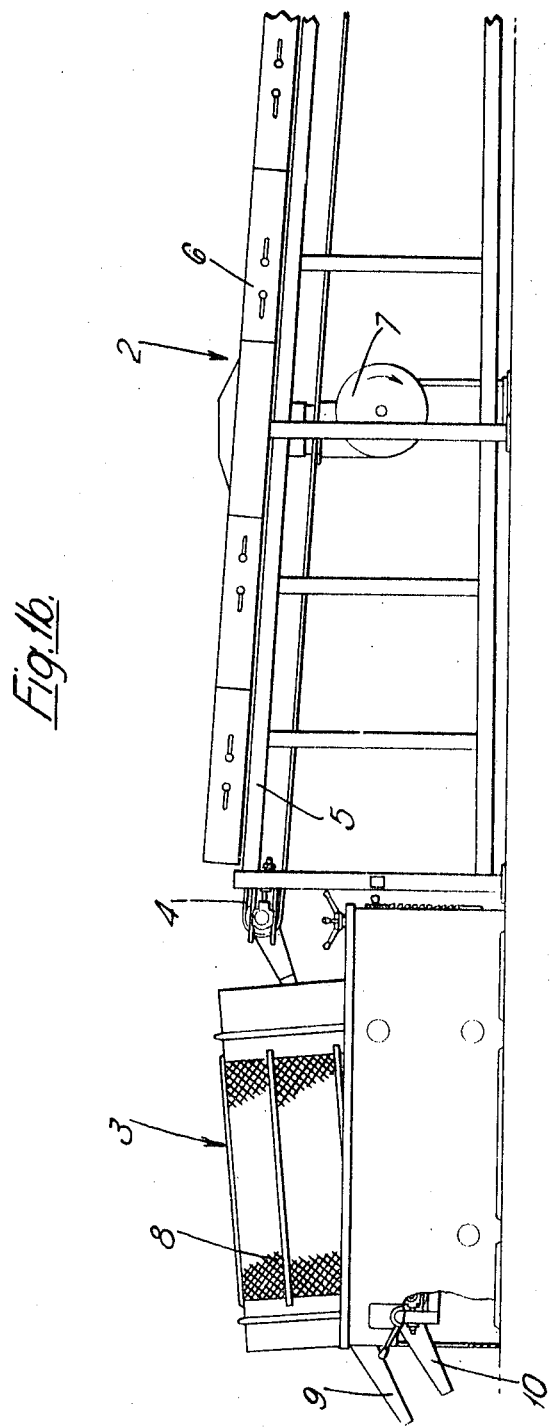

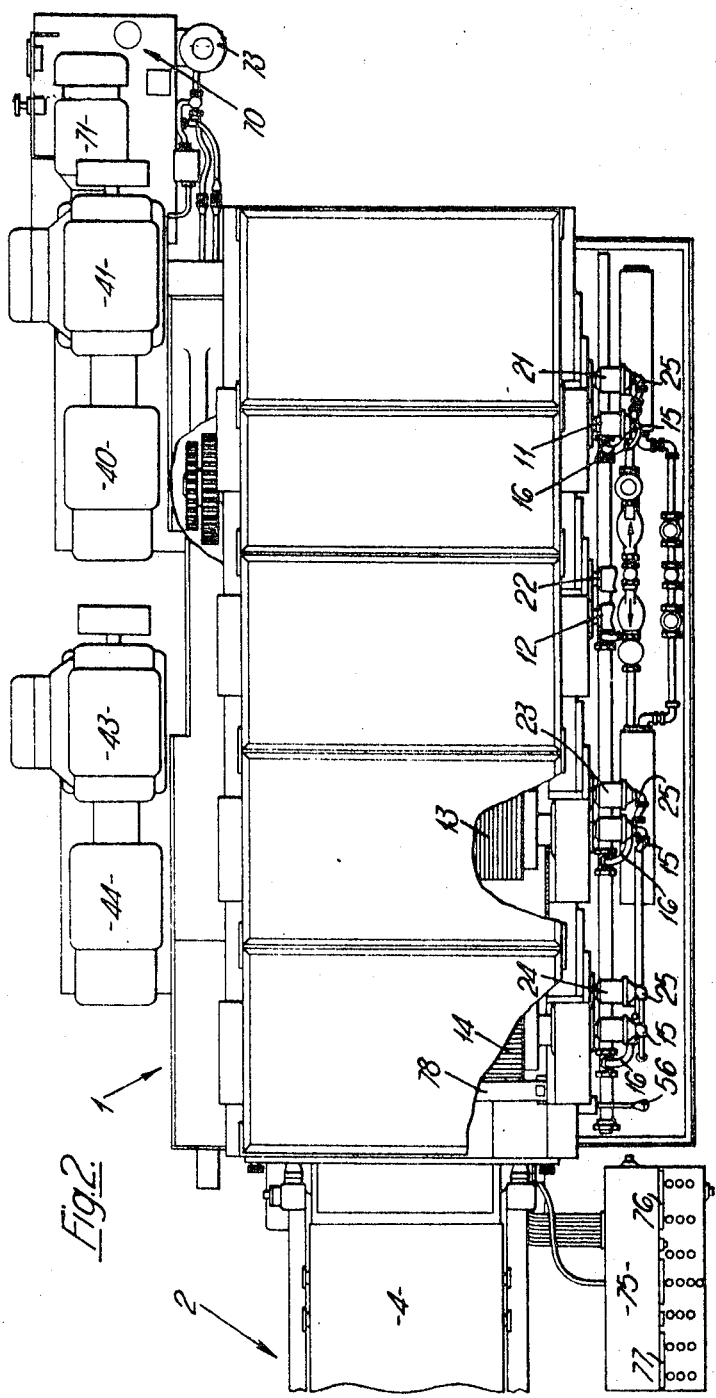

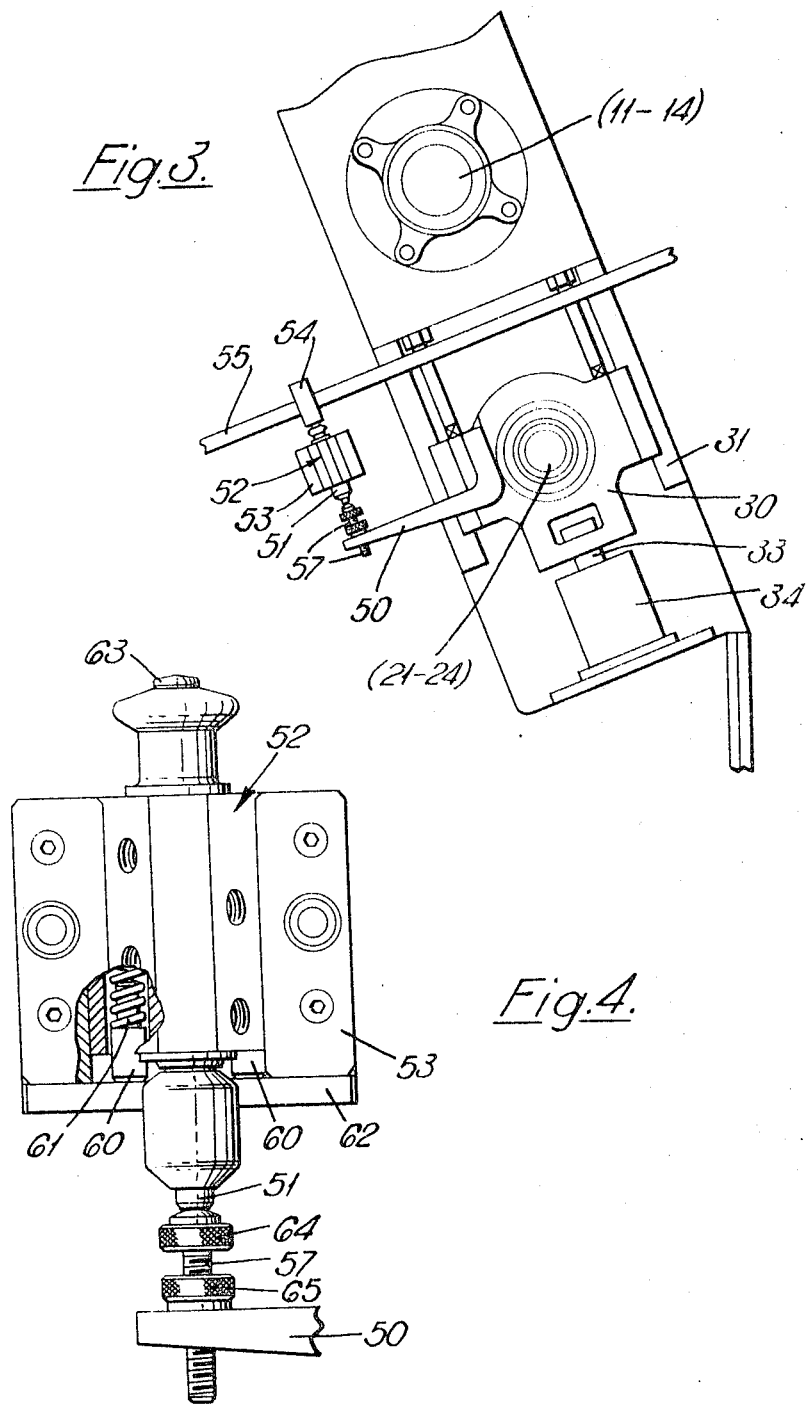

3,585,677
APPARATUS FOR MOLDING PELLETS
Alfred Walter Barker, Bletchley, England, assignor to The Sandall Precision Company Limited, Bletchley, England
Filed June 4, 1969, Ser. No. 830,435
Int. Cl. B29c 3/02, 3/06; B29d 7/10
U.S. Cl. 18—1
10 Claims

ABSTRACT OF THE DISCLOSURE

The disclosure concerns the moulding of pellets from materials of varying hardness and adhesiveness, particularly so-called "high boiled glucose" by rolling the material to a continuous sheet and thereafter rolling longitudinal grooves and transverse grooves in a surface of the sheet by successive roll pairs, the rolls of the roll pairs being maintained at selected separations by pressure fluid-operated adjustment means responsive to departure of roll separation from selected value.

---

This invention concerns the moulding of pellets of sugar and like materials, such as confectionary materials.

Conventionally, confectionary, e.g. sugar confectionary, is moulded by feeding a sheet of compacted material between a pair of rollers that are pocketed so that at the nip a band of pockets in formed into which the sheet material is compressed. Alternatively, a rope of compacted material is fed over a pocketed drum so that sections of the rope are received in the drum pockets and therein moulded between diesets moving in the pockets.

These techniques are satisfactory for moulding relatively large shapes from suitable materials but are at best unreliable for moulding small pellets, especially from materials that do not readily form a compacted sheet or rope of uniform consistency and which have a low density and a high adherence to a mould.

A raw material of the confectionary trade is glucose. This material is normally stored and transported in a liquid form since although it may be dehydrated to a solid form, the solid obtained by evaporation (so-called "high-boiled glucose") is hygroscopic, tending to agglomerate and being therefore generally inconvenient to handle. However we have found that so-called "high-boiled glucose" when moulded into small pellets under substantial compression has a reduced affinity for water and that such small pellets may be stored in sealed containers, for instance sealed polyethylene film sacks, for substantial periods without significantly loosing their separate identity by agglomeration or adherence to one another.

"High-boiled glucose" typically differs from the normal liquid form available in bulk by having a water content approximately 14% by weight less than that of the liquid form; evaporation of this amount of water by boiling does not otherwise affect the glucose and the original liquid form may be reconstituted merely by the addition of the appropriate amount of water and heating to a temperature of 210° F. to complete dissolution of the solid. However, "high-boiled glucose" has a somewhat variable texture and hardness and its moulding into small pellets is therefore difficult to perform consistently at a high throughput. Thus, "high-boiled glucose" shares with some other confectionary materials the inability to be reliably moulded into small pellets by conventional confectionary moulding machinery as above described.

An objective of the present invention is therefore to provide a machine that is capable of reliably moulding small pellets of "high-boiled glucose" and similar materials.

A moulding machine in accordance with the invention comprises at least three pairs of rolls arranged in sequence, each roll pair comprising a fixed roll and a roll movable towards and away from said fixed roll; pressure fluid-actuated means for urging the movable roll towards said fixed roll and controlled by valve means responsive to the position of the movable roll in the path of its said movement, so as to maintain said movable roll at a predetermined distance from said fixed roll, all said movable rolls having plain cylindrical surfaces whereas the penultimate fixed roll has circumferential ribs at least partially to divide material passing the nip of the penultimate roll pair into longitudinal strips, and the final fixed roll having paraxial peripheral ribs for at least partially dividing material passing the nip of the final roll pair into transverse strips.

In such a machine the first roll pair (and any additional roll pair preceding the penultimate roll pair in a machine having more than three roll pairs) serves to form the feed material into a sheet of predetermined thickness which, by reason of the manner in which the movable roll of the or each said roll pair is adjusted in response to departure from its selected position, may be held to a close tolerance, e.g. within a few ten-thousands of an inch. The final two roll pairs may therefore accurately and consistently mould this sheet of material into small rectangular pyramidal pellets that, depending upon the setting of the gaps between the rolls of the final two roll pairs in the relationship to the height of the ribs on the fixed rolls thereof, are either separate or joined together by a thin web. Because the fixed rolls of the final two roll pairs are not pocketed, and co-operate with plain cylindrical rolls, there is little risk of adhesion of the material to these rolls.

Preferably the roll pairs are arranged with their nips aligned in a downwardly inclined plane and a correspondingly inclined guide is provided between the successive roll pairs thereby to utilise gravity to assist transport of the material through the machine.

Desirably each roll pair is associated with a trip mechanism adapted to arrest the machine in the event that adhering material is carried round one roll of a roll pair and re-enters the nip thereof, thereby wedging the rolls apart.

Preferably each roll co-operates with lubricant feed means, e.g. a roller train extending into a lubricant reservoir, whereby all the rolls are lubricated to minimise adherence of material thereto.

Preferably the fixed rolls constitute the upper roll of each roll pair and the lower roll of each pair is supported in guides and upon fluid pressure-operated jacks, e.g. hydraulic jacks, supplied via a servo-valve from a suitable pressure source, said valve being responsive to the movable roll position with respect to the fixed roll of its pair. However, the movable rolls could be uppermost if spring or like means were provided to support these rolls and provide a restoring force to oppose pressure fluid-actuated means arranged to urge the movable rolls downwardly towards the fixed rolls.

A typical embodiment of the invention is illustrated by way of example in the accompanying drawings in which:

FIGS. 1a and 1b is a side elevation of apparatus embodying the invention and adapted for forming pellets of "high-boiled glucose";

FIG. 2 is a plan view, on a larger scale, of the pellet-forming machine of the apparatus of FIG. 1a;

FIG. 3 is a somewhat simplified side elevational view of the control system for maintaining a predetermined gap between the rolls of a roll pair of the pellet-forming machine of FIG. 2; and FIG. 4 is a part-sectional elevation of the servo-valve incorporated in the control system shown in FIG. 3.

Figure 1A:
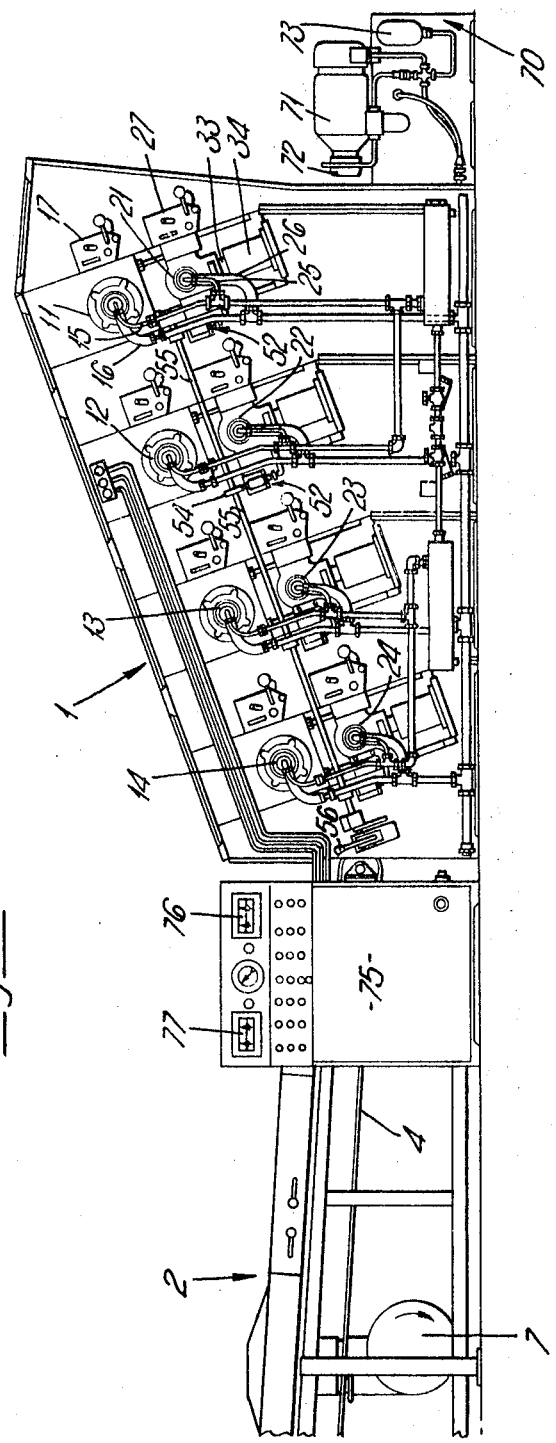

The apparatus illustrated in the drawings is intended for moulding rectangular pyramidal pellets of "high-boiled glucose" and, as shown in FIGS. 1a and 1b, comprises a pellet-forming machine that receives a feed of "high-boiling glucose" and converts the same into rectangular pyramidal pellets mainly joined to one another by a very thin web to form a sheet, a cooling unit 2 that receives the said pellets from the machine 1 and is effective to cool the pellets to ambient temperature, and a sifter unit 3 that receives the cooled pellets from the cooler unit 2 and by tumbling action completes the break-up of the sheet of pellets into the individual pellets and the separation of these from smaller particles of glucose, providing separate discharges for the pellets on the one hand and the waste particles on the other. As a guide to the size of this apparatus it may be mentioned that the overall length of the apparatus illustrated in FIGS. 1a and 1b may be about 50 feet, of which about 14 feet 6 inches is occupied by the pellet-forming machine 1 and its associated power supplies, the cooler unit 2 occupying about 26 feet and 6 inches whilst the sifter unit occupies about 8 feet.

The invention is primarily embodied in the pellet-forming machine 1 that is shown in greater detail in FIGS. 2, 3 and 4. However before describing this pellet-forming machine, the succeeding units will be briefly described, it being understood that the cooler unit 2 and the sifter unit 3 might be replaced by other devices performing the same functions, or either or both might be omitted in the case of other apparatus incorporating a pellet-forming machine embodying the invention but adapted for other purposes than the pelletising of "high-boiled glucose."

Thus, in the apparatus illustrated in FIGS. 1a and 1b the cooler unit 2 comprises an endless conveyor belt 4 the upper run of which moves to the left as seen in FIGS. 1a and 1b within a trough 5 covered by trunking 6 connected to a pair of fans 7 by means of which a stream of air is caused to flow over the material on the conveyor belt so as to cool the same. In the arrangement shown, the cooler unit 2 has its trough 5 inclined so that material conveyed by the belt 4 from the forming machine 1 to the sifter unit 3 is raised in level but it should be understood that this is merely to suit the difference in level between the outlet of the forming machine 1 and the inlet of the sifter unit 3 in this particular arrangement.

The sifter unit 3 comprises a sifter drum 8 the axis of which is inclined at a small angle to the horizontal and which is arranged for continuous rotation about its axis by drive means (not shown). The drum 8 is of polygonal cross section, the sides being formed by sieve panels of suitable mesh, these panels being supported between longitudinal ribs that project into the body of the drum so as to ensure tumbling of material therein during rotation of the drum. The inclination of the drum 8 is adjustable so as to enable it to be set to achieve optimum effectiveness of its operation at various feed material throughputs, and feed material, in this case the aforesaid rectangular pyramidal pellets of "high-boiled glucose," mostly joined together in a continuous sheet and fragments thereof, is fed into the upper end of the drum 8. The tumbling action of the drum is effective to separate the individual pellets from one another, whilst small particles of glucose pass through the sieve panels of the drum to be separated from the pellets. The pellets are discharged from the lower end of the drum 8 via a discharge chute 9 whilst the material passing through the sieve panels of the drum falls onto a belt (not shown) arranged therebeneath and is conveyed to a discharge chute 10.

Referring now to the pellet-forming machine 1, this comprises a suitable structure supporting four pairs of horizontal rolls arranged with their nips in alignment so as sequentially to act on a feed of "high-boiled glucose." To facilitate movement of the feed from one roll pair to the next the roll pairs are arranged with their nips aligned with a downwardly sloping table over which the feed material moves between successive roll pairs.

The upper rolls of each of the four roll pairs, that is the rolls 11, 12, 13 and 14 as shown in FIGS. 1a and 2, are supported in fixed positions and as will be seen the rolls 11 and 12 have plain cylindrical surfaces whereas the roll 13 has circumferential ribs whilst the roll 14 has paraxial peripheral ribs. Each of these rolls is hollow and provided with inlet and outlet connections 15 and 16 respectively, the inlet connection 15 being associated with supplies of steam and cold water so that either of these fluids may be admitted as required to the interior of the roll to adjust its temperature to that required, whilst the outlet connection 16 leads to a drain. Each of the rolls 11, 12, 13, 14 is also fitted with a temperature-sensing thermocouple (not shown) the signal from which is utilised by a controller for valves regulating the said steam and water supplies to the inlet connections 15.

Each of the rolls 11, 12, 13 and 14 is associated with a lubricating system comprising a lubricant tank 17 fitted with a train of contiguous rolls for transferring lubricant from one to the next, the last roll of the train being in contact with the roll 11, 12, 13 or 14 as the case may be so as to transfer lubricant to the surface of that roll.

Each of the roll pairs further comprises a movable lower roll. Thus, the roll 11 is associated with a movable roll 21, the roll 12 is associated with a movable roll 22, the roll 13 is associated with a movable roll 23 and the roll 14 is associated with a movable roll 24.

All the rolls 21, 22, 23, 24 have plain cylindrical surfaces and are hollow and equipped with inlet and outlet connections 25, 26 respectively coupled to the connections 15 and 16 of their associated upper rolls. Moreover each of the said lower rolls is associated with a lubricating system comprising a lubricant tank 27 with a train of contiguous rolls for transferring lubricant to the lower roll surface.

Each of the said lower rolls 21 to 24 is supported in bearing blocks 30 that are slidably arranged in guides 31 so the roll is movable bodily towards and away from its associated upper roll thereby to adjust the gap between it and its associated upper roll. The two bearing blocks 30 of each lower roll are each supported upon the ram 33 of an individual double-acting hydraulic jack 34 the cylinder of which is fixed to the frame of the machine. Thus extension of a jack 34 is effective to raise the adjacent end of the lower roll of the associated roll pair to diminish the gap between that end of the roll and its associated upper roll and conversely, retraction of a jack 34 is effective to lower the adjacent end of the lower roll to increase the gap.

The upper and lower rolls of a roll pair (e.g. the rolls 11 and 21) have hubs fitted with pinions that intermesh so that both rolls of a pair are constrained to run at equal peripheral velocities. The said pinions (not shown) have appropriately cut teeth to maintain satisfactory meshing notwithstanding small changes of pinion centre separation due to movement of the lower roll.

The hub of the roll 12 is further provided with a second pinion that meshes with a drive pinion also meshed with the pinion on the hub of roll 11, the drive pinion in turn being meshed with the output pinion of a speed-reduction unit 40 driven by an electric motor 41. The arrangement is such that the rolls 12 and 22 are driven at a greater peripheral velocity than the rolls 11 and 21.

In a similar manner the roll pairs 13, 23 and 14, 24 are driven from an electric motor 43 via a speed-reduction unit 44.

Referring now to FIG. 3 this shows, with some simplification, the manner in which the jacks 34 of a roll pair are controlled so as to maintain a preset gap between the rolls of that roll pair.

As shown in FIG. 3 the bearing block 30 at each end of the lower roll of a roll pair has a projecting arm 50 arranged to co-operate with the shuttle 51 of a hydraulic servo-valve 52 that controls the flow of pressure fluid to and from the cylinder spaces of the jack 34 associated with that bearing block 30. The arrangement is such that when the shuttle 51 is moved downwardly or upwardly by corresponding movement of the arm 50, the valve 52 is actuated to exhaust pressure fluid from one cylinder space of the jack 34 and to supply pressure fluid to the other cylinder space of that jack, thereby to extend or retract its ram 33 and raise or lower the associated bearing block 30 so as thereby to restore the pre-existing position of its end of the lower roll of the roll pair in question.

The servo-valves 52 are supported by brackets 53 fixed to the frame of the machine 1, the valves 52 being slidable axially in said brackets 53 and being spring-urged upwardly as more fully described in relation to FIG. 4. The body of each valve 52 at one side of the machine co-operates with a cam 54 on one of a pair of camshafts 55, the valves 52 at the other side of the machine similarly co-operate with cams on the other camshaft 55. The rotational positions of the camshafts 55 are controlled by a thickness control level 56 (see FIGS. 1a and 2) so that by operation of said lever 56 all the servo-valves 52 may be displaced in unison to cause a corresponding displacement of both ends of each lower roll of all the roll pairs. Thus, by adjustment of the lever 56 the servo-valves 52 will cause corresponding adjustments of the gap defined by each roll pair.

The actual gap at each end of an individual roll pair for any given setting of the thickness control lever 56 is adjustable by means of adjusting spindles 57 interposed between the arms 50 and the shuttles 51 of the servo-valves associated with that roll pair; the settings of the adjusting spindles 57 in the arms 50 thus determine the positions of the ends of the lower roll at which the shuttles 51 of the servo-valves are held in their neutral positions, for any given setting of the lever 56.

FIG. 4 illustrates in more detail the arrangement of a servo-valve 52 on its bracket 53 and the manner in which its shuttle co-operates with the arm 50 through the adjusting spindle 57. As shown, the body of the servo-valve is axially slidable on the bracket 53 and has a pair of longitudinal bores each housing a plunger 60 that is urged downwardly, relatively to the valve housing, by means of a spring 61, the plunger 60 bearing on a flange 62 at the base of the bracket 53 so as to urge the valve body upwardly with respect to the bracket. The upper end of the valve body is formed with a boss 63 for engagement with a cam 54 (not shown in FIG. 4) the effect of the plunger 60 and their springs 61 thereby being to maintain the boss 63 in contact with the associated cam 54.

As further shown in FIG. 4, the adjusting spindle 57 that engages the shuttle 51 of the valve is screw-threaded and screws into a bore extending through the arm 50, the spindle 57 having a knurled head 64 and being fitted with a knurled locknut 65 respectively to facilitate adjustment of the position of the spindle in the arm 50 and the securing of the spindle in its adjusted position.

Reverting to FIGS. 1a and 2, it will be seen that the pellet-forming machine is further equipped with a hydraulic power unit 70 comprising an electric motor 71 driving an output pressure-controlled variable delivery pump 72 that draws hydraulic fluid from a suitable reservoir and maintains a substantially constant pressure in an accumulator 73 connected to a delivery line extending to the eight servo-valves 52. FIG. 1a also shows a control console 75 housing various controls for the operation of the machine, e.g. contactors and switchgear for controlling the various electric motors, a temperature controller with display indicator 76 that controls the temperature of the roll pairs 11, 21 and 12, 22 by adjustment of the steam and water supply valves of the inlets 15 of those rolls, a similar temperature controller with display indicator 77 for controlling the temperature of the other two roll pairs, and other control facilities.

FIG. 2 also shows a trip bar 78 that co-operates with the upper roll 14 to detect the adherence of material thereto; displacement of the bar 78 by adhering material is effective to arrest the machine. Similar trip bars co-operate with the rolls 11, 12 and 13.

I claim:
1. A moulding machine, comprising:
   (a) at least three pairs of rolls arranged in sequence;
   (b) each said roll pair comprising a fixed roll and a roll movable towards and away from said fixed roll;
   (c) pressure fluid-actuated means for urging the said movable roll of a said pair towards said fixed roll thereof;
   (d) valve means responsive to the position of a said movable roll in the path of its said movement and controlling the said pressure fluid-actuated means to maintain said movable roll at a predetermined distance from said fixed roll;
   (e) all said movable rolls having plain cylindrical surfaces;
   (f) circumferential ribs on the penultimate fixed roll for at least partially dividing material passing the nip of the penultimate roll pair into longitudinal strips;
   (g) paraxial peripheral ribs on the final fixed roll for at least partially dividing material passing the nip of the final roll pair into transverse strips.

2. The moulding machine of claim 1, in which said roll pairs are arranged with their nips aligned in a downwardly inclined plane, a correspondingly inclined guide being positioned between successive roll pairs thereby to utilise gravity to assist transport of the material through the machine.

3. The moulding machine of claim 1, including a trip mechanism adapted to arrest the machine in the event of adherence of material to a roll of a said roll pair.

4. The moulding machine of claim 1, including lubricant feed means co-operating with each said roll.

5. The moulding machine of claim 1, in which each said roll pair comprises a fixed upper roll and a movable lower roll.

6. The moulding machine of claim 5, in which each said pressure fluid-actuated means comprises an individual pressure-operated jack co-operating with each end of the associated movable roll, and said valve means comprise an individual servo-valve associated with each said jack and responsive to departure of the related end of the said movable roll from a prescribed position relatively to the axis of the associated fixed roll.

7. The moulding machine of claim 6, in which each said servo-valve is arranged for adjustment relatively to the axis of the fixed roll of its associated pair, thereby to adjust the said prescribed position of the movable roll of the pair.

8. The moulding machine of claim 7, in which all said servo-valves are adjustable, relatively to the axes of their respective fixed rolls, by cam means adapted for common adjustment.

9. The moulding machine of claim 8, including means for independently determining said prescribed position for each end of each movable roll.

10. The moulding machine of claim 9, in which said jacks are hydraulic jacks.

References Cited

UNITED STATES PATENTS

| | | | |
|---|---|---|---|
| 670,312 | 3/1901 | Cressonnieres | 18—1X |
| 2,678,465 | 5/1954 | Schnuck et al. | 18—2 |
| 3,122,107 | 2/1964 | Magnusson et al. | 25—2X |
| 3,264,682 | 8/1966 | Freeman | 18—2 |
| 3,387,322 | 6/1968 | Woellhof et al. | 18—2 |

J. SPENCER OVERHOLSER, Primary Examiner

R. L. SPICER, Jr., Assistant Examiner

U.S. Cl. X.R.

18—2, 4, 9; 25—2; 18—21; 107—14